United States Patent
Dunleavy et al.

(10) Patent No.: US 12,466,139 B2
(45) Date of Patent: Nov. 11, 2025

(54) APPLICATION HEAD FOR AUTOMATICALLY APPLYING FIBRES

(71) Applicants: SAFRAN, Paris (FR); SAFRAN NACELLES, Gonfreville-l'Orcher (FR)

(72) Inventors: Patrick Dunleavy, Moissy-Cramayel (FR); Bertrand Léon Marie Desjoyeaux, Moissy-Cramayel (FR)

(73) Assignees: SAFRAN, Paris (FR); SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/727,273

(22) PCT Filed: Dec. 30, 2022

(86) PCT No.: PCT/FR2022/052520
§ 371 (c)(1),
(2) Date: Jul. 8, 2024

(87) PCT Pub. No.: WO2023/135375
PCT Pub. Date: Jul. 20, 2023

(65) Prior Publication Data
US 2024/0416597 A1   Dec. 19, 2024

(30) Foreign Application Priority Data
Jan. 12, 2022   (FR) ...................................... 2200223

(51) Int. Cl.
*B29C 70/38*         (2006.01)
*B29C 70/24*         (2006.01)
(Continued)

(52) U.S. Cl.
CPC ............ *B29C 70/384* (2013.01); *B29C 70/24* (2013.01); *B29C 70/54* (2013.01); *B29L 2031/087* (2013.01)

(58) Field of Classification Search
None
See application file for complete search history.

(56) References Cited

U.S. PATENT DOCUMENTS 9,757,904 B2 *  9/2017  Ufer ........................ B29B 11/16
10,821,682 B2 * 11/2020  Hamlyn ................... B26D 5/12
(Continued)

FOREIGN PATENT DOCUMENTS

| | | |
|---|---|---|
| CA | 3051884 A1 | 8/2018 |
| CN | 103180126 A | 6/2013 |

(Continued)

OTHER PUBLICATIONS

WO2021156550A1_machine_translation (Year: 2021).*
Search Report and Written Opinion issued in International Application PCT/FR2022/052520, mailed Jul. 20, 2023.

*Primary Examiner* — Michael N Orlando
*Assistant Examiner* — Abhishek A Patwardhan
(74) *Attorney, Agent, or Firm* — Bookoff McAndrews, PLLC

(57) ABSTRACT

Application head for automated fiber placement, which application head includes at least: an application roller that is designed to apply fibers to a shaping tool which application roller is rotatably movable on its axis for applying fibers to the shaping tool, and a feed device includes a winding of a strip of fibers having a predefined orientation, the strip of fibers being configured to be transferred by unwinding from the feed device onto the application roller with at least one portion of the fibers of the strip being oriented such that they are not perpendicular to the axis of the roller.

15 Claims, 4 Drawing Sheets

(51) Int. Cl.
    *B29C 70/54*          (2006.01)
    *B29L 31/08*         (2006.01)

(56)             References Cited

U.S. PATENT DOCUMENTS

| | | | |
|---|---|---|---|
| 2009/0090804 A1 | 4/2009 | Torres | |
| 2009/0266485 A1 | 10/2009 | Torres | |
| 2011/0091684 A1* | 4/2011 | Holloway | B29C 70/386 |
| | | | 428/113 |
| 2017/0348876 A1* | 12/2017 | Lin | B32B 27/283 |
| 2020/0047435 A1* | 2/2020 | James | B29C 70/542 |

FOREIGN PATENT DOCUMENTS

| | | | |
|---|---|---|---|
| CN | 107530987 A | 1/2018 | |
| WO | 2004067264 A1 | 8/2004 | |
| WO | WO-2021156550 A1 * | 8/2021 | B29C 70/38 |

\* cited by examiner

[Fig. 1]
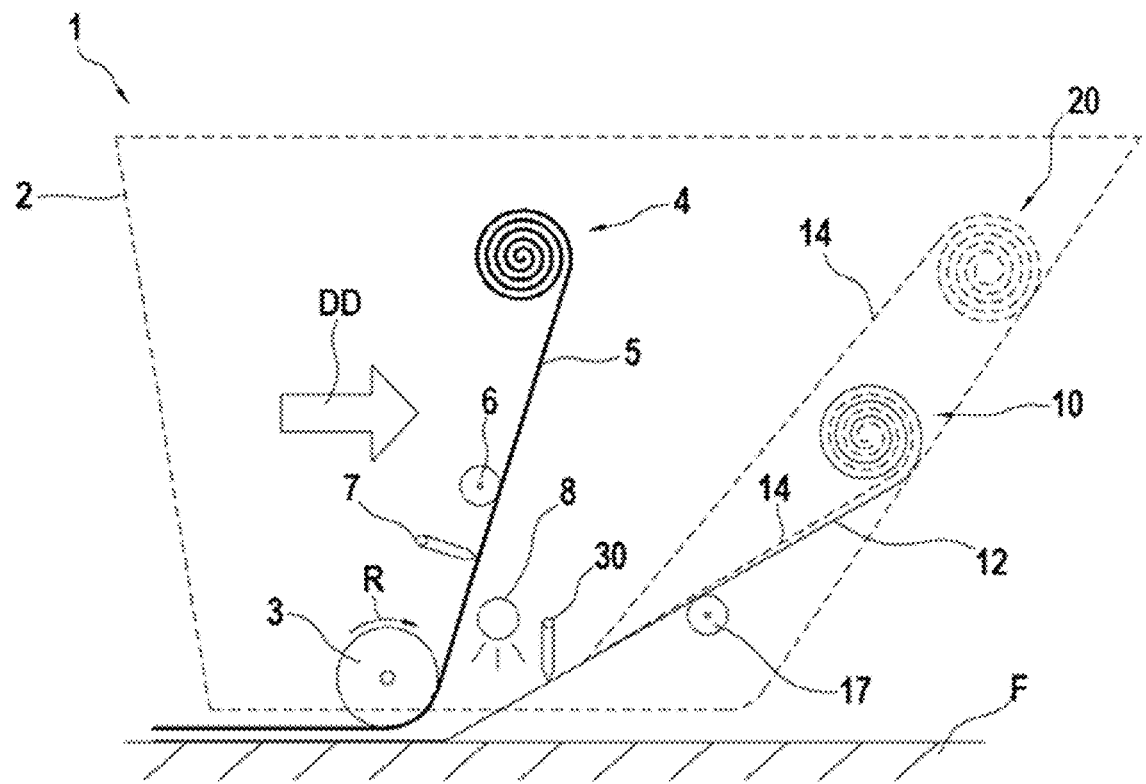
[Fig. 2]
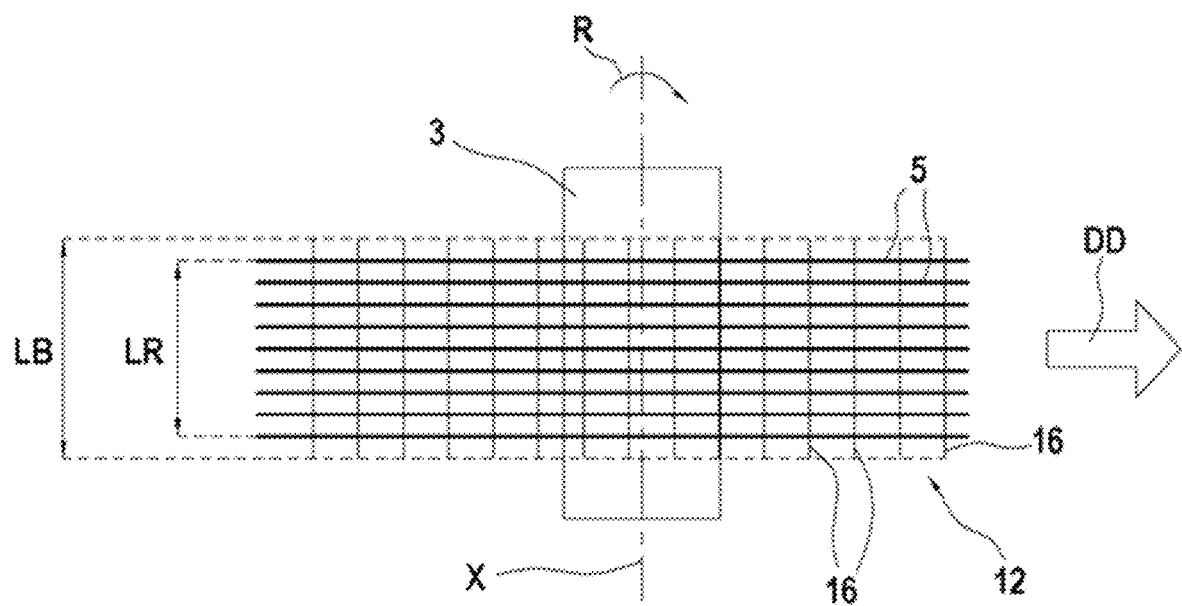

[Fig. 3]
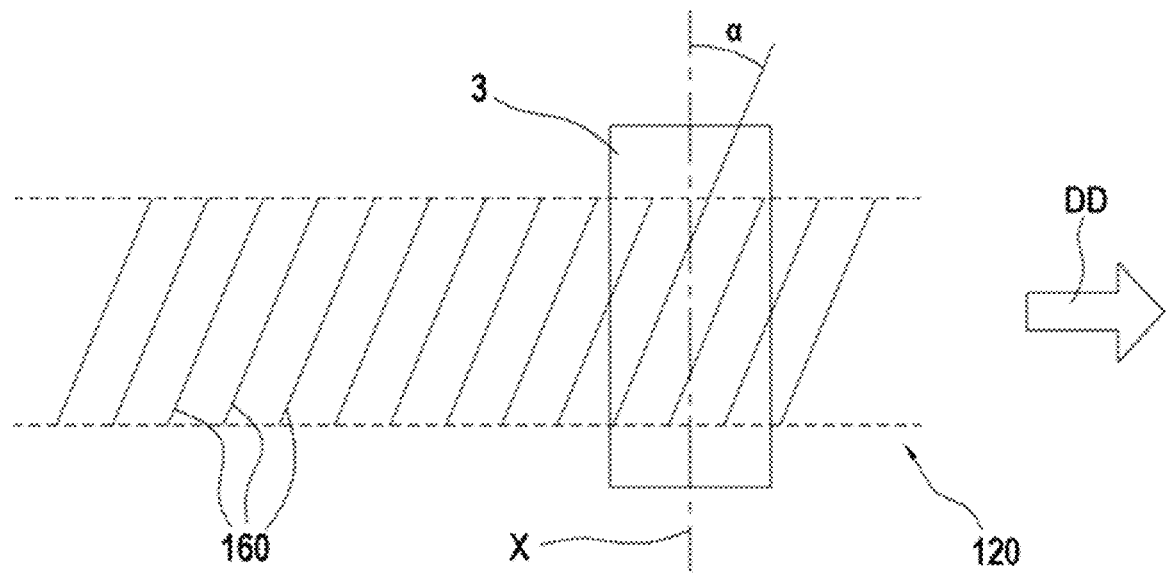
[Fig. 4]
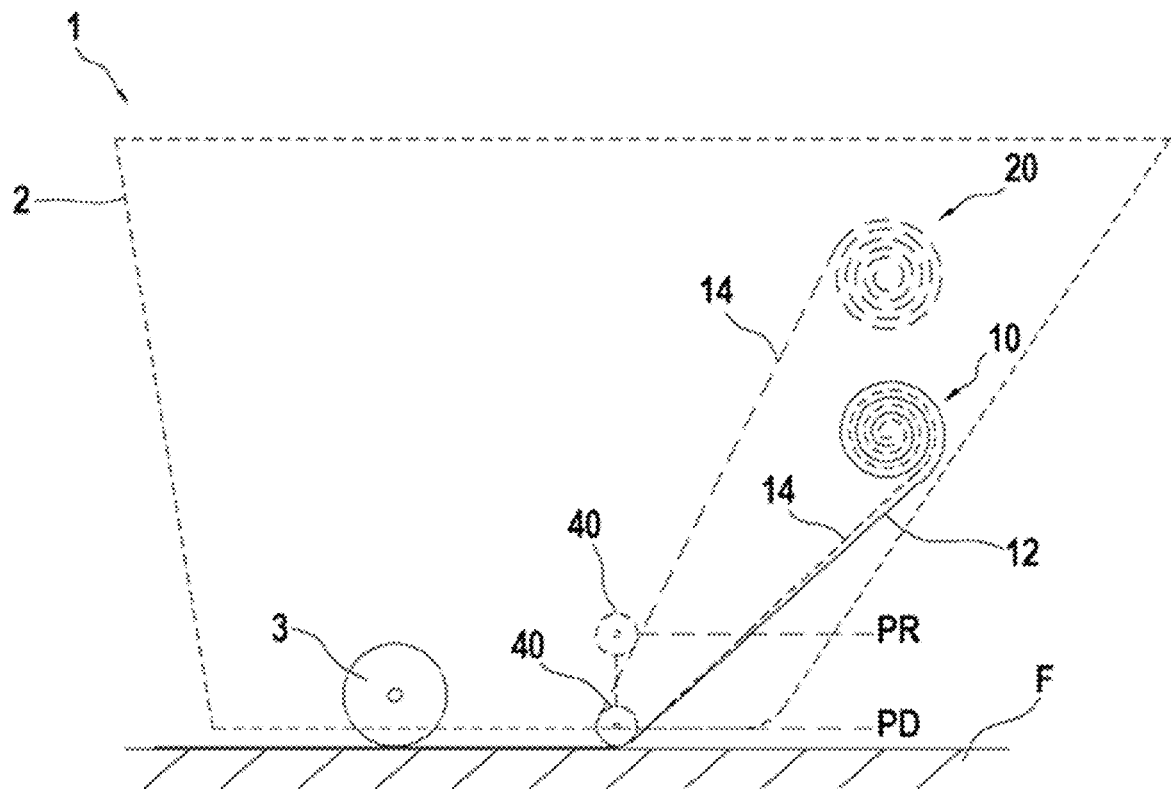

[Fig. 5]
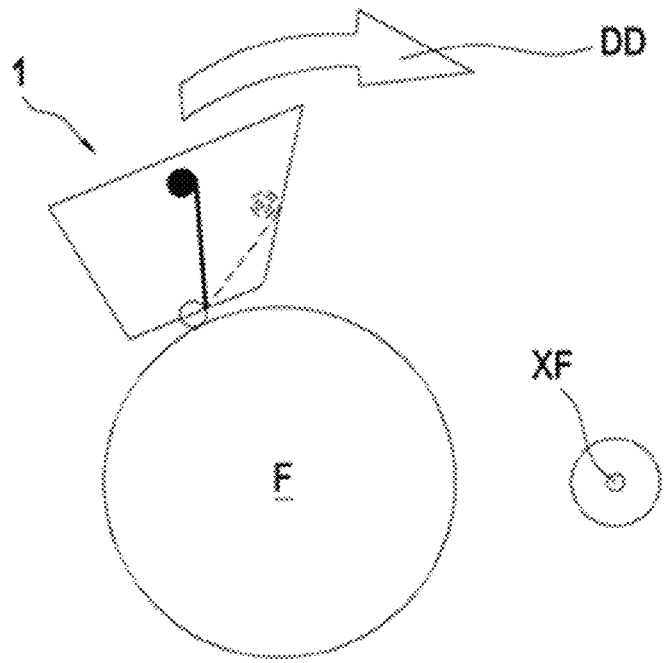
[Fig. 6]
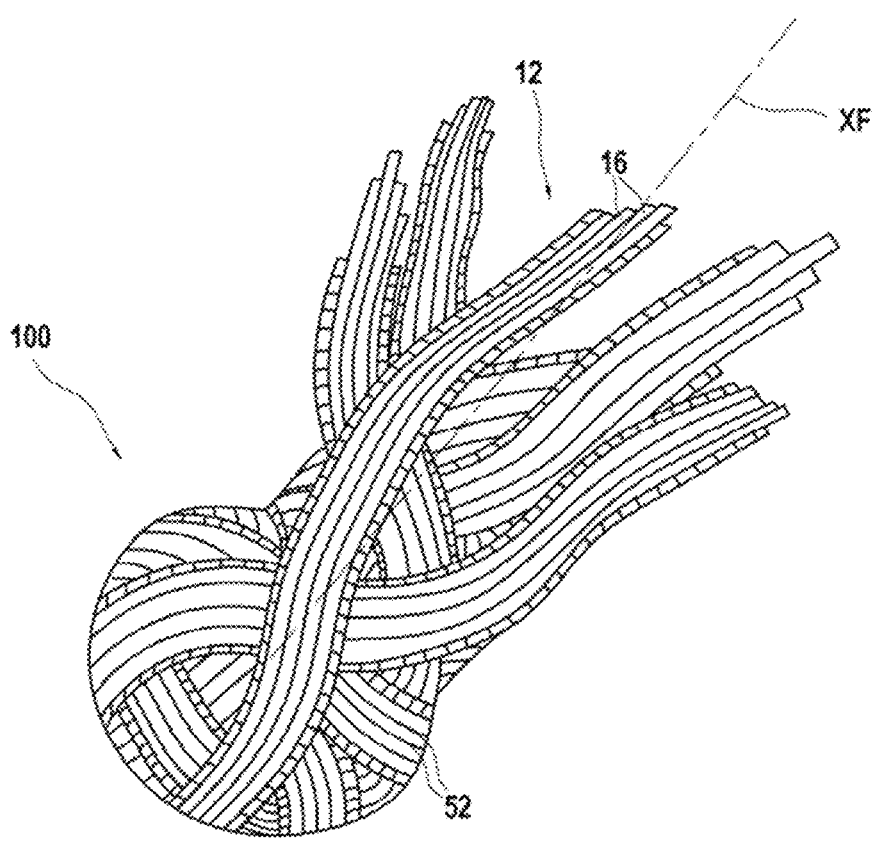

[Fig. 7]
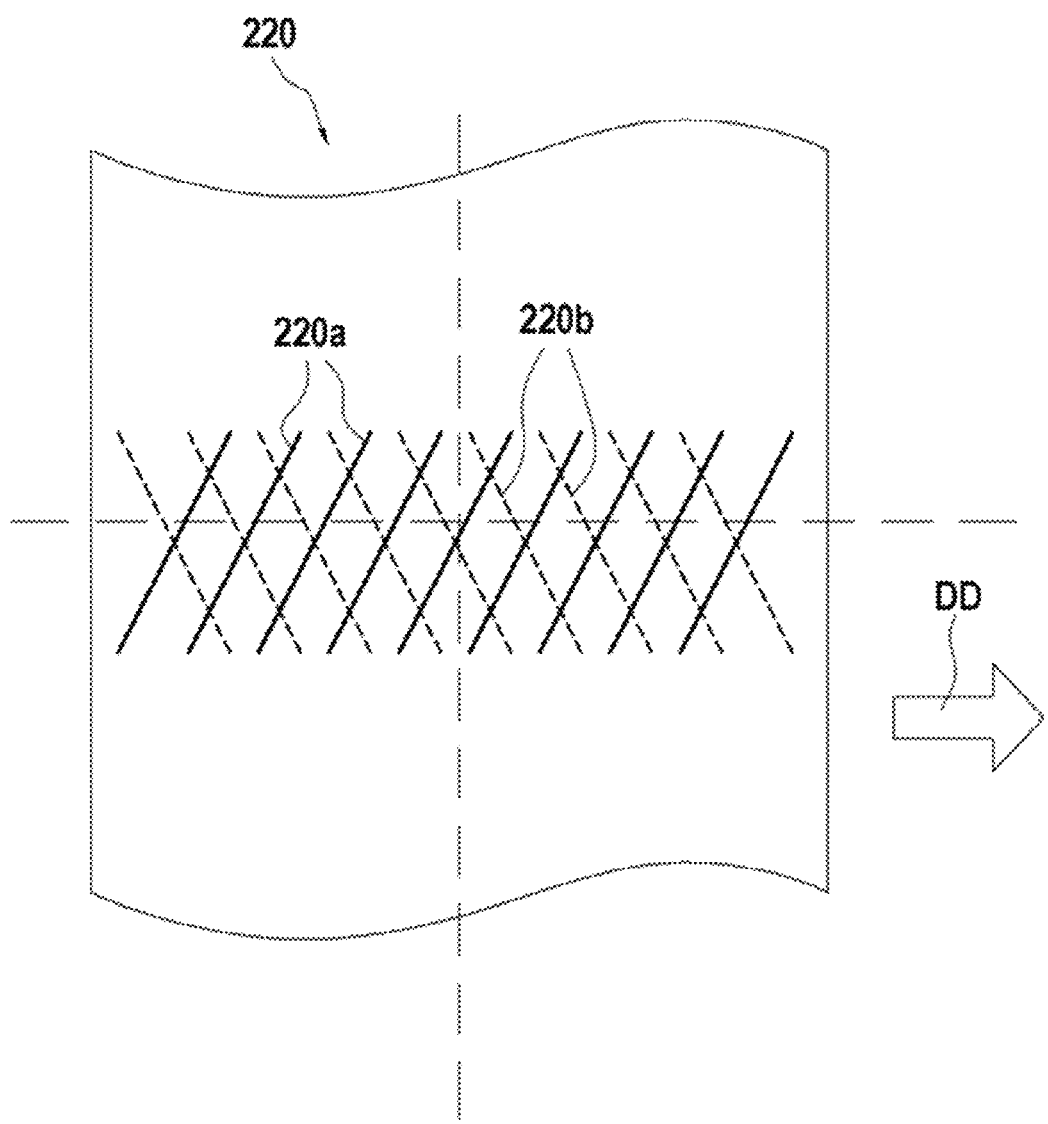

APPLICATION HEAD FOR AUTOMATICALLY APPLYING FIBRES

CROSS-REFERENCE TO RELATED APPLICATIONS

This is a National Stage Application under 35 U.S.C. § 371 of International Application No. PCT/FR2022/052520, filed Dec. 30, 2022, now published as WO 2023/135375 A1, which claims priority to French Patent Application No. 2200223, filed on Jan. 12, 2022.

TECHNICAL FIELD

The invention relates to an application head for automated fiber placement which is capable of depositing fibers in a predefined orientation, transverse to the direction of movement of the application roller in order to allow to obtain a desired orientation of the reinforcement for parts made of composite material of particular geometry and large size, such as blades or propellers having a base with extra thickness.

PRIOR ART

Aeronautical parts made of composite material comprise a fibrous reinforcement that can be manufactured by weaving. However, when these parts have large dimensions, the manufacture of the reinforcement by weaving can be complicated. This may in particular be the case of propulsive propellers for structures without a casing (known as "open-rotor"). These propellers can conventionally pivot around the axis by having a root for fixing to the disc having a portion of extra thickness, called "bulb root" or "tulip root", having for example a spherical shape which can be difficult to manufacture by three-dimensional weaving.

Automated fiber placement methods (known as "AFP") can be considered to form such parts to respond to the limitations of weaving techniques. However, with conventional methods, it is possible to encounter a problem of bulkiness of the depositing machine head at the neck, that is to say the area of reduced diameter just above the tulip root. Indeed, when the head moves along the longitudinal axis of the part, the head then risks touching the neck of the part. One solution is to locally modify the shape of the part, but as the latter is established for a particular function, this approach is not completely satisfactory.

The invention proposes to respond to the limitations of prior techniques.

DISCLOSURE OF THE INVENTION

The invention relates to an application head for automated fiber placement, comprising at least:
 an application roller that is designed to apply fibers to a shaping tool which application roller is rotatably movable on its axis for applying fibers to the shaping tool, and
 a feed device comprising a winding of a strip of fibers having a predefined orientation, said strip of fibers being configured to be transferred by unwinding from the feed device onto the application roller with at least one portion of the fibers of the strip being oriented such that they are not perpendicular to the axis of the roller.

The invention characteristically implements a strip of fibers with a predefined orientation which allows to deposit them transversely to the movement of the application roller (which is perpendicular to its axis) and not parallel to this movement as in conventional automated fiber placement techniques. In this way and as will be described in more detail below, the invention allows access to a wide variety of orientations of the reinforcement for particular geometries, such as a tulip root, without risk of the head touching the shaping tool used to manufacture the part. The invention thus allows to optimize the manufacture of the reinforcement for shaping tools of parts of varied shapes.

In an exemplary embodiment, the head further comprises a pre-application roller upstream of the application roller capable of being moved between a retracted position configured not to apply the strip to the shaping tool and a deposition position configured to apply the strip to the shaping tool.

The deposition position ensures the beginning of application of the strip to the shaping tool and the retracted position allows more kinematic freedom of movement of the head with respect to the surface to be draped. The pre-application roller can be movable transversely to the surface of the shaping tool.

In an exemplary embodiment, the strip is coated with a separator film and the head further comprises a detachment device capable of detaching the separator film from the strip upstream of the application roller.

Such a characteristic advantageously allows to use a strip impregnated with resins having an adhesive strength at room temperature and to avoid the need to heat the strip when depositing it on the shaping tool. The strip can be impregnated with the matrix material or with a precursor of this material, or with a binder intended to provide adhesive strength for the deposition of the fibers but not or not completely constituting the matrix to be obtained. Moreover, the separator film can have a support function allowing to maintain the fibers oriented. The detachment device may be capable of rolling up the detached separator film.

In an exemplary embodiment, the fibers of the strip form an angle less than or equal to 45°, for example less than or equal to 30°, with the axis of the roller, for example are substantially parallel to the axis of the roller.

In an exemplary embodiment, the head further comprises a cutting device capable of cutting the strip.

The cutting device allows the strip to be cut at the end of each deposition phase. Note that the presence of this cutting device is optional for fibers of the strip forming a small angle relative to the axis of the roller for which the supply of the strip stops while the application roller continues to advance may be sufficient to separate the deposited portion of strip from the portion present on the roller not yet deposited.

In an exemplary embodiment, the strip comprises at least a first layer of fibers having a first predefined orientation and a second layer of fibers, superimposed on the first layer of fibers, having a second predefined orientation distinct from the first orientation.

Such a machine configuration allows to deposit several layers of fibers simultaneously in an organized manner without pleats and gives access to a more complex orientation of the reinforcement allowing to better adapt to the needs. Thus, this combines both optimized overall mechanical strength and reduced draping time.

In an exemplary embodiment, the head further comprises at least a second feed device capable of supplying one or more ribbons of fibers configured to be transferred from the second feed device to the application roller with the fibers of this or these ribbons oriented perpendicular to the axis of the roller.

Such a characteristic relates to a "hybrid" application head capable of depositing, simultaneously or sequentially, ribbons oriented along the movement of the roller, as used in conventional AFP techniques, and strips of fibers oriented transversely to this movement. Such a head is particularly suitable for the manufacture of parts of complex shape requiring alternations of fiber orientations, in particular blades and blade roots. In the following, these ribbons may be referred to as "AFP ribbons".

The invention also relates to a method for manufacturing a fibrous preform by automated fiber placement using an application head as described above, comprising at least the deposition of the strip of fibers on the shaping tool by the application roller, at least one portion of the fibers of the strip being deposited transversely to a direction of movement of the application roller.

In particular, the method may further comprise the deposition of the ribbon(s) on the shaping tool by the application roller, sequentially or simultaneously with the deposition of the strip, the fibers of this or these ribbons being able to be deposited along the direction of movement of the application roller.

This case relates to the case where the preform is produced using the same application head ("hybrid" head mentioned above) which carries both the AFP ribbon(s) and the fibrous strip. Of course, one does not depart from the scope of the invention if a first application head embedding the fibrous strip oriented as described above, and a second distinct application head embedding the fiber ribbon(s) corresponding to a conventional AFP application head are used to form the fibrous preform.

In particular, a width of the deposited strip of fibers may be greater than a total width of the deposited ribbon(s) of fibers.

According to this example, the transverse fibers cover, by extending beyond, the ribbon(s) which advantageously allows to ensure continuity of mechanical strength by their bonding with the superimposed and offset drapings.

In an exemplary embodiment, the fibrous preform is a preform of a blade or propeller tulip root and the head is moved at least around a longitudinal axis of the shaping tool to achieve the application of fibers allowing to form the fibrous preform.

The invention is of particular interest for the formation of a tulip root because it allows in particular to manufacture a structure with optimized mechanical properties having a thick root and continuity with the airfoil portion.

The invention also relates to a preform of a tulip root of a blade or propeller capable of being obtained by implementing the method as described above, comprising at least a first set of fibrous strip portions whose fibers are oriented with a non-zero component along a longitudinal axis of the tulip root, and a second set of portions of fibrous ribbons whose fibers are oriented circumferentially around this longitudinal axis and are transverse to the fibers of the first set.

BRIEF DESCRIPTION OF THE DRAWINGS

FIG. 1 schematically and partially shows an example of an application head for automated fiber placement according to the invention.

FIG. 2 shows the orientations of the fibers deposited using the head of FIG. 1 relative to the axis of the application roller and its direction of movement.

FIG. 3 shows another possible orientation for the fibers of the fibrous strip.

FIG. 4 schematically and partially shows a variant of an application head according to the invention.

FIG. 5 schematically and partially shows the formation of a fibrous preform of a tulip root of a blade or propeller using an application head according to the invention.

FIG. 6 illustrates a tulip root preform according to the invention.

FIG. 7 schematically and partially shows a variant of multilayer strip with oriented fibers usable in the context of the invention.

DESCRIPTION OF THE EMBODIMENTS

FIG. 1 illustrates an example of application head 1 according to the invention for automated fiber placement. In the example considered, the head 1 comprises a body 2 enclosing a module for depositing AFP ribbons as well as a module for depositing a strip of oriented fibers. The head 1 is mounted on a movement and orientation system allowing it to achieve the same degrees of freedom as a conventional AFP head. The AFP ribbon deposition module corresponds to a conventional structure and comprises, in a manner known per se, a feed device 4 capable of supplying fiber ribbons 5 for example in the form of a plurality of feed reels. The ribbons 5 are transferred by unwinding the reels onto an application roller 3, which is intended to allow depositing on the shaping tool F. A guide element 6 is present in order to facilitate this transfer such as one or more rotating elements equipped with guide grooves. The roller 3 is deformable so as to take the local curvature of the shaping tool F in order to deposit the material at the desired local geometry. The roller 3 has, at rest, a generally cylindrical shape and is rotatable on its axis X, which corresponds to the axis of the height of the roller, when moving along the shaping tool F. In the figures, the direction of movement of the roller 3 along the shaping tool F is indicated by the arrow DD. The rotation of the roller 3 during deposition is, in turn, indicated by the arrow R. A ribbon cutting device 7 allows them to be cut to the desired length during deposition and a rerouting element (not illustrated) is present to transfer the portion of the ribbons not yet deposited to the roller 3 after cutting. The cutting device can typically be a simple straight or rotating cutting blade, an ultrasonic vibrating blade or else a laser cutting device. A heating member 8 is present which allows to activate the adhesive strength of a resin present in the ribbon 5 in order to promote its adhesion to the material already deposited. For example, a width of a ribbon 5, measured perpendicularly to a direction of movement DD of the roller 3, can be less than or equal to 25 mm, for example comprised between 3 mm and 25 mm.

The body 2 of the head 1 further contains a feed device 10 which comprises a winding of a strip 12 of fibers 16 having a predefined orientation. The strip 12 is impregnated with a resin intended to allow adhesion to the material deposited during application by the roller 3. The strip 12 is here coated with a separator film 14 which can constitute a support for the fibers of the strip but can also provide a non-stick function in order to avoid unwanted bonding of the layers of the rolled strip before deposition, particularly when a resin that is sticky at room temperature (20° C.) is used. However, one does not depart from the scope of the invention if this film 14 is omitted. Similarly to the AFP ribbon module 5, the strip 12 is transferred by unwinding from the feed device 10 to the application roller 3. Parallel to this transfer, the film 14 is detached before the strip 12 arrives at the application roller 3 by rewinding by the rotary detachment device 20. A cutting device 30 is present to cut the strip to the desired length as well as a rerouting element (not shown). A guiding device 17 can also be added as for the AFP module if this is desired. The same heating member 8 allowing to heat the ribbons 5 and the strip 12 during their deposition was shown but one does not depart from the scope of the invention if several heating members are present, respectively for the ribbons and the strips. The choice of the number and position of the heating elements is made as required. It is also possible not to use a heating element if a resin having an adhesive strength at room temperature is used.

Characteristically, the orientation of the fibers 16 of the strip 12 is predefined in a particular manner and transversely to the orientation of the fibers of the AFP ribbons. As illustrated in FIGS. 2 and 3, the orientation of the fibers 16 at the roller 3 is not perpendicular to the axis X, which produces a deposition of these fibers oriented transversely to the direction of movement DD. In other words, the fibers 16 extend along a direction of elongation which is not perpendicular to the axis X. The fibers 16 are oriented at a non-zero angle with respect to the length of the strip 12. The connection between the fibers of the strip 12 in the direction DD can be relatively weak and give a certain freedom to the fibers 16 to move away from each other and to deform according to the curvilinear length to be described. The case of a strip 12 whose fibers 16 deposited by the roller 3 are oriented substantially parallel to the axis X, that is to say substantially perpendicular to the direction of movement DD is shown in FIG. 2. However, the orientation of the fibers 16 can be modulated according to the desired orientation for the reinforcement for the considered part. FIG. 3 thus illustrates the case of a strip 120 having fibers 160 oblique to the axis. Other orientations are possible for the fibers of the strip, for example the case of a strip 220 with at least two superimposed layers of which the fibers 220a of a first layer are oriented with a first orientation relative to the axis X and of which the fibers 220b of a second layer superimposed on the first layer are oriented with a second orientation, distinct from the first orientation, relative to the axis X, for example the fibers 220a and 220b are oriented at +/−30° relative to the axis X (see FIG. 7). In this case, the superimposed layers can have the same or different widths. As indicated above, the cutting device 30 can be omitted in the case of fibers 16 strongly inclined relative to the direction DD as illustrated in FIG. 2, for example. Generally speaking, the strip 12 may comprise at least one unidirectional layer of fibers 16 parallel to each other. The strip 12 is constituted, prior to its assembly in the head 1, by assembly and arrangement of fibers 16 held together, for example by a resin, this assembly possibly being carried out on the film 14. The AFP ribbons 5 are in turn deposited parallel to the direction DD and therefore transversely to the fibers 16. The strip 12 has a width LB, measured perpendicularly to the direction DD, which is greater than the width of each of the ribbons 5. The width of the strip 12 is for example greater or equal to 100 mm, for example comprised between 100 mm and 300 mm. As illustrated in FIG. 2, the width LB of the strip 12 can advantageously be greater than the total (cumulative) width LR of the deposited ribbons 5. The deposited strip 12 can, as illustrated, cover and extend beyond the area covered by the deposited ribbons 5. Generally speaking, the person skilled in the art will determine the width LB of the strip 12 and the number of ribbons 5 to be deposited according to the need. Generally speaking, the ribbons 5 and the fibers of the strip 12 can be made of carbon or glass.

FIG. 4 illustrates a variant embodiment in which the body 2 of the head 1 further comprises a pre-application roller 40 upstream of the roller 3 which is able to be moved between a retracted position PR in which it does not press on the strip 12 to deposit it on the shaping tool, and a deposition position PD in which it applies the strip 12 to the shaping tool. In the example illustrated, the roller 40 is above the roller 3 in the retracted position PR and at the roller 3, to press on the shaping tool F, in the deposition position PD. The person skilled in the art will recognize that various systems can be used to move the pre-application roller 40. Like the roller 3, the pre-application roller 40 is rotatably movable on its axis.

Various details relating to examples of application heads according to the invention have just been described. Although a "hybrid" head has been illustrated in FIG. 1, it will be noted that one does not depart from the scope of the invention when the AFP module is omitted and the head considered only comprises the band 12 to be deposited by the roller 3.

The following attempts to describe a possible use of a head according to the invention in the case of the manufacture of a tulip root of a blade or propeller with reference to FIGS. 5 and 6.

FIG. 5 illustrates the manufacture of a fibrous preform in which the head 1 is moved around a longitudinal axis XF of the shaping tool F to carry out the application of fibers. This prevents the head from moving along the longitudinal axis XF, risking its impact with the part being formed. All or part of the draping can be carried out by alternately depositing ribbons 5 and the strip 12, in quantity, widths and directions to optimize the mechanical performance of the part obtained. All or part of the draping can be carried out using a machine simultaneously distributing the ribbons 5 and the strip of fibers transverse to the direction DD. An example of a tulip root preform 100 obtained in the context of the invention is illustrated in FIG. 6, said tulip root preform comprises a first set of fibrous strip portions formed by the fibers 16 which are oriented with a non-zero component along the axis XF and a second set of fibrous ribbon portions of which the fibers 52 are oriented circumferentially around this axis and transverse to the fibers 16. There can be an alternation in stacking and positions of the fibrous strip portions and the fibrous ribbon portions. It is thus possible to obtain a draping forming the tulip root but also a portion of the airfoil if the shaping tool comprises a spar shape on which it is deposited, with advantageously a continuity of material between the airfoil and the tulip root. Then it is thus possible to carry out baking to polymerize the resin impregnating the preform and thus obtain the final part. The invention is thus of particular interest for manufacturing, in an economical and efficient manner, parts with strong curvature such as, for example, blade roots in spherical shape as has just been described. The tulip root can be manufactured with the same "hybrid" head 1 allowing the deposition of ribbons 5 and strip 12 but one does not depart from the scope of the invention if use is made of a head according to the invention allowing only the deposition of the strip 12 and a separate conventional AFP head for depositing the ribbons 5.

The expression "comprised between . . . and . . . " must be understood as including the limits.

The invention claimed is:

1. An application head for automated fiber placement, comprising at least:
    an application roller that is intended to apply fibers to a shaping tool which application roller is rotatably movable on its axis for applying fibers to the shaping tool, and
    a feed device comprising a winding of a strip of fibers having a predefined orientation, said strip of fibers being configured to be transferred by unwinding from the feed device onto the application roller with at least one portion of the fibers of the strip being oriented such that they are not perpendicular to the axis of the roller, the strip having a width measured along the axis of the roller, wherein the head further comprises at least a second feed device capable of supplying one or more ribbons of fibers configured to be transferred from the second feed device to the application roller with the fibers of this or these ribbons oriented perpendicular to the axis of the roller, the width of the strip being greater than the width of each of the ribbons which is measured along the axis of the roller.

2. The head according to claim 1, wherein the head further comprises a pre-application roller upstream of the application roller capable of being moved between a retracted position configured not to apply the strip to the shaping tool and a deposition position configured to apply the strip to the shaping tool.

3. The head according to claim 1, wherein the strip is coated with a separator film and the head further comprises a detachment device capable of detaching the separator film from the strip upstream of the application roller.

4. The head according to claim 1, wherein the fibers of the strip form an angle less than or equal to 45° with the axis of the roller.

5. The head according to claim 1, wherein the head further comprises a cutting device capable of cutting the strip.

6. The head according to claim 1, wherein the strip comprises a first layer of fibers having a first predefined orientation and a second layer of fibers, superimposed on the first layer of fibers, having a second predefined orientation distinct from the first orientation.

7. A method for manufacturing a fibrous preform by automated fiber placement using an application head according to claim 1, comprising a deposition of the strip of fibers on the shaping tool by the application roller, at least one portion of the fibers of the strip being deposited transversely to a direction of movement of the application roller.

8. The method according to claim 7, wherein the method further comprises the deposition of the one or more ribbons on the shaping tool by the application roller, sequentially or simultaneously with the deposition of the strip, the fibers of this or these ribbons being deposited along the direction of movement of the application roller.

9. The method according to claim 8, wherein a width of the deposited strip of fibers is greater than a total width of the deposited one or more of fibers.

10. The method according to claim 7, wherein the fibrous preform is a preform of a blade or propeller tulip root and wherein the head is moved at least around a longitudinal axis of the shaping tool to achieve the application of fibers allowing to form the fibrous preform.

11. The method according to claim 8, wherein the fibrous preform is a preform of a blade or propeller tulip root and wherein the head is moved at least around a longitudinal axis of the shaping tool to achieve the application of fibers allowing to form the fibrous preform.

12. A fibrous preform of a tulip root of a blade or propeller capable of being obtained by implementing the method according to claim 10, comprising a first set of fibrous strip portions of which the fibers are oriented with a non-zero component along a longitudinal axis of the tulip root, and a second set of portions of fibrous ribbons whose fibers are oriented circumferentially around this longitudinal axis and are transverse to the fibers of the first set.

13. The head according to claim 1, wherein the width of the strip is greater than a total cumulative width of the one or more ribbons.

14. The head according to claim 1, further comprising a heating member configured to activate an adhesive strength of resin present in the strip of fibers.

15. The head according to claim 1, further comprising a guide element configured to facilitate the transfer of the strip of fibers to the application roller.

* * * * *